US011356566B2

United States Patent
Alvarez Dominguez et al.

(10) Patent No.: US 11,356,566 B2
(45) Date of Patent: Jun. 7, 2022

(54) QUALITY OF SERVICE FOR A VIDEO STREAMING SERVICE

(71) Applicant: Telefonaktiebolaget LM Ericsson (publ), Stockholm (SE)

(72) Inventors: Rodrigo Alvarez Dominguez, Madrid (ES); Ibon Gochi Garcia, Madrid (ES); Carlos Jimenez Cordon, Madrid (ES); Miguel Angel Muñoz De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 506 days.

(21) Appl. No.: 16/463,659

(22) PCT Filed: Dec. 6, 2016

(86) PCT No.: PCT/EP2016/079929
§ 371 (c)(1),
(2) Date: May 23, 2019

(87) PCT Pub. No.: WO2018/103827
PCT Pub. Date: Jun. 14, 2018

(65) Prior Publication Data
US 2021/0120129 A1    Apr. 22, 2021

(51) Int. Cl.
*H04M 15/00*     (2006.01)
*H04W 28/24*     (2009.01)

(52) U.S. Cl.
CPC ........... *H04M 15/66* (2013.01); *H04M 15/62* (2013.01); *H04M 15/8016* (2013.01); *H04M 15/881* (2013.01); *H04W 28/24* (2013.01)

(58) Field of Classification Search
CPC .. H04M 15/66; H04M 15/62; H04M 15/8016; H04M 15/881; H04M 15/00;
(Continued)

(56) References Cited

U.S. PATENT DOCUMENTS 9,191,960 B2 * 11/2015 Garcia Martin .... H04W 72/048
9,294,902 B2 *  3/2016 Castro-Castro ..... H04L 41/5051
(Continued)

FOREIGN PATENT DOCUMENTS

WO    2011120229 A1    10/2011

OTHER PUBLICATIONS

International Search Report and Written Opinion dated Aug. 9, 2017 for International Application No. PCT/EP2016/079929 filed on Dec. 6, 2016, consisting of 9-pages.
(Continued)

*Primary Examiner* — Hassan Kizou
*Assistant Examiner* — Abdullahi Ahmed
(74) *Attorney, Agent, or Firm* — Sage Patent Group

(57) ABSTRACT

Methods and apparatus for managing quality of service for video streaming, in which a Policy and Charging Rules Function (PCRF) in a Policy Charging Control (PCC) architecture of a telecommunications system receives from a Policy Control Enforcement Function (PCEF) a notification indicating that a video service has started for streaming video content to a user equipment (UE). A first Quality of Service (QoS) setting for streaming the video service to the UE is determined. First QoS setting data identifying the first QoS setting is transmitted to the PCEF. The PCEF transmits a further notification to the PCRF indicating that a particular stage has been reached. The PCRF receives the notification from the PCEF. In response to the further notification, a second QoS setting specifying a lower QoS than the first QoS setting for streaming the video service after the particular stage is determined. The PCRF identifies the second QoS setting to the PCEF.

16 Claims, 4 Drawing Sheets

(58) Field of Classification Search
CPC .... H04M 15/83; H04M 15/85; H04M 15/852; H04M 15/88; H04M 15/882; H04M 15/883; H04M 15/885; H04W 28/24; H04W 4/24; H04L 12/1407
See application file for complete search history.

(56) References Cited

U.S. PATENT DOCUMENTS

| | | | |
|---|---|---|---|
| 2012/0275300 A1* | 11/2012 | Munoz De La Torre Alonso | H04L 67/16 370/229 |
| 2013/0016624 A1* | 1/2013 | Li | H04L 41/5025 370/252 |
| 2013/0262308 A1* | 10/2013 | Cai | G06Q 20/42 705/44 |

OTHER PUBLICATIONS

ETSI TR 101 578 V1.1.1; Speech and multimedia Transmission Quality (STQ); QoS aspects of TCP-based video services like YouTube™; Dec. 2013, consisting of 25-pages.

3GPP TS 23.203 V14.1.0; 3rd Generation Partnership Project; Technical Specification Group Services and System Aspects; Policy and charging control architecture (Release 14); Sep. 2016, consisting of 253-pages.

\* cited by examiner

QUALITY OF SERVICE FOR A VIDEO STREAMING SERVICE

CROSS-REFERENCE TO RELATED APPLICATIONS

This application is a Submission Under 35 U.S.C. § 371 for U.S. National Stage Patent Application of International Application Number: PCT/EP2016/079929, filed Dec. 6, 2016 entitled "QUALITY OF SERVICE FOR A VIDEO STREAMING SERVICE," the entirety of which is incorporated herein by reference.

TECHNICAL FIELD

The invention relates to streaming of video services across a telecommunications network to a User Equipment (UE). In particular, the invention relates to reducing the usage of network resources for streaming video services.

BACKGROUND

The Policy and Charging Control (PCC) architecture in telecommunications networks permits the integration of both policy and charging control. The PCC architecture is specified in 3GPP TS 23.203 for Evolved 3GPP Packet Switched domain, including both non-3GPP accesses and 3GPP accesses, such as GSM EDGE Radio Access Network (GERAN), Universal Terrestrial Radio Access network (UTRAN) and Evolved Universal Terrestrial Radio Access network (E-UTRAN).

FIG. 1 shows an exemplary PCC architecture comprising, amongst other network nodes, a Policy and Charging Rules Function (PCRF) 100, a Policy and Charging Enforcement Function (PCEF) 102, a Traffic Detection Function (TDF) 104 and
Subscription Profile Repository (SPR) 106.
  The PCRF 100 is a functional element that performs policy control decision and flow based charging control. The PCRF 100 provides network control regarding the service data flow detection, gating, QoS and flow based charging (except credit management) towards the PCEF 102.
  The PCEF 102 encompasses service data flow detection, policy enforcement and flow based charging functionalities. Deep Packet Inspection (DPI) technology, which may be embedded in the PCEF 102, is configured to inspect/analyse the contents of Internet Protocol (IP) data packets beyond the so called "IP 5 tuples". The IP 5 tuples are the heading elements of an IP data packet comprising: IP source address, IP destination address, source transport address, destination transport address, and protocol over IP (e.g. Transmission Control Protocol (TCP) or User Datagram Protocol (UDP)). Therefore, DPI technology is configured to inspect and analyse the application layer information conveyed by IP data packets. As a result of DPI analysis, service classification information can be obtained, which allows IP packets to be classified.
  The TDF 104 corresponds to a stand-alone entity implementing the DPI technology.
  The SPR 106 is a logical entity comprising all subscriber/subscription related information needed for subscription-based policies and Internet Protocol Connectivity Access Network (IP-CAN) bearer level PCC rules by the PCRF 100.

Current video solutions divide TCP based video services provided to a User Equipment (UE) into phases. FIG. 2 shows the phases of a video service. At the beginning of a download phase 200 the video service buffers video data during a buffering phase 202 undertaken so that a sufficient amount of video content may be stored locally at the UE to allow the video to be played. The buffering phase 202 starts with the first transfer of the video content and ends when the first frame of the video is displayed. In general terms, buffering occurs when there is not enough information in the video buffer of the player so the UE cannot play the video.

After the buffering phase 202 has ended and there is enough video content in the buffer, the UE begins to play the stored video content in a playout phase 204. During a first part 206 of the playout phase 204, video content is still being downloaded until the transfer of video content is ended and the remainder of the video is played during a second part 208 of the playout phase 204. Using some content provider services, once the initial buffering phase 202 has finished, the UE typically periodically downloads some video frames in order to keep the buffer state over the minimum needed to play the video content.

An important metric in the use of video services is the time taken to begin playback of video content, that is, the time taken for the buffering phase 202.

SUMMARY

The inventors have appreciated that use of a large amount of network resource during certain phases of a video service is justified because those phases should be completed relatively quickly, for example the buffering phase 202 should be as short as possible. However, during other phases of the video service, less network resource is required to maintain adequate playback of the video content, for example during the playout phase 204. Accordingly, the inventors have appreciated that the usage of network resource may be reduced at a particular stage, e.g. after a buffering phase, of a video service.

According to an aspect of the invention, there is provided a network node for use as a Policy and Charging Rules Function, PCRF, in a Policy Charging Control architecture of a telecommunications system. The network node comprises a receiving means, which may be a receiver, configured to receive from a Policy Control Enforcement Function, PCEF, a notification indicating that a video service has started for streaming video content to a User Equipment, UE, of a user. The network node comprises a quality determining means, which may be a quality determiner, configured to determine a first Quality of Service, QoS, setting for streaming the video service to the UE. The network node comprises a transmitting means, which may be a transmitter, configured to transmit first QoS setting data identifying the first QoS setting to the PCEF. The receiver is further configured to receive a further notification from the PCEF indicating that the video service has reached a particular stage. The quality determiner is further configured, in response to the further notification, to determine a second QoS setting specifying a lower QoS than the first QoS setting and for streaming the video service after the particular stage. The transmitter is configured to transmit second QoS setting data identifying the second QoS setting to the PCEF.

Optionally, the particular stage of the video service is the end of a buffering phase and/or the beginning of a playout phase. In an embodiment, and generally applicable throughout this specification, the particular stage of the video service may correspond to the end of a buffering phase, the beginning of a playout phase, or any phase close to, or between, them.

Optionally, the receiver is configured to receive playout period data from the PCEF indicating whether the video service is in an on period or an off period of the playout phase, wherein the quality determiner is configured to determine the second QoS setting if the playout period data indicates an on period, and to determine a third QoS setting specifying a lower QoS than the second QoS setting if the playout period data indicates an off period, and wherein the transmitter is configured, if the third QoS setting is determined, to transmit third QoS setting data identifying the third QoS setting to the PCEF.

Optionally, the receiver is further configured to receive subscription information for the user from a Subscription Profile Repository, SPR, the network node further comprising a video service managing means, which may be a video service manager, configured, based on the received subscription information, to determine whether the video service should be monitored to identify one or more particular stages, wherein the transmitter is configured to transmit to the PCEF video service monitoring data identifying whether the video service should be monitored.

Optionally, a lower QoS is specified in a QoS setting with a higher QoS Class Identifier, QCI, value; and wherein a higher QoS is specified in a QoS setting with a lower QCI value.

According to the invention in a further aspect, there is provided a method for operating a network node for use as a Policy and Charging Rules Function, PCRF, in a Policy Charging Control architecture of a telecommunications system. The method comprises receiving, by a receiver from a Policy Control Enforcement Function, PCEF, a notification indicating that a video service has started for streaming video content to a User Equipment, UE, of a user. The method comprises determining, by a quality determiner, a first Quality of Service, QoS, setting for streaming the video service to the UE. The method comprises transmitting, by a transmitter, first QoS setting data identifying the first QoS setting to the PCEF. The method comprises receiving, by the receiver, a further notification from the PCEF indicating that the video service has reached a particular stage. The method comprises determining, by the quality determiner and in response to the further notification, a second QoS setting specifying a lower QoS than the first QoS setting and for streaming the video service after the particular stage. The method comprises transmitting, by the transmitter, second QoS setting data identifying the second QoS setting to the PCEF.

Optionally, the particular stage of the video service is the end of a buffering phase and/or the beginning of a playout phase.

Optionally, the method further comprises receiving, by the receiver from the PCEF, playout period data indicating whether the video service is in an on period or an off period of the playout phase; determining, by the quality determiner, the second QoS setting if the playout period data indicates an on period, or determining, by the quality determiner, a third QoS setting specifying a lower QoS than the second QoS setting if the playout period data indicates an off period; and if the third QoS setting is determined, transmitting, by the transmitter to the PCEF, third QoS setting data identifying the third QoS setting.

Optionally, the method further comprises receiving, by the receiver from a Subscription Profile Repository, SPR, subscription information for the user; determining, by a video service manager and based on the received subscription information, whether the video service should be monitored to identify one or more particular stages; and transmitting, by the transmitter to the PCEF, video service monitoring data identifying whether the video service should be monitored.

Optionally, a lower QoS is specified in a QoS setting with a higher QoS Class Identifier, QCI, value; and wherein a higher QoS is specified in a QoS setting with a lower QCI value.

According to the invention in a further aspect, there is provided a network node for use as a Policy Control Enforcement Function, PCEF, in a Policy Charging Control architecture of a telecommunications system. The network node comprises a video service monitoring means, which may be a video service monitor, configured to determine whether a video service has started for streaming video content to a User Equipment, UE, of a user. The network node comprises a transmitting means, which may be a transmitter, configured to transmit to a Policy and Charging Rules Function, PCRF, a notification indicating that the video service has started. The network node comprises a receiving means, which may be a receiver, configured to receive from the PCRF first Quality of Service, QoS, setting data identifying a first QoS setting for streaming the video service to the UE. The network node comprises a quality assigning means, which may be a quality assigner configured to assign the first QoS setting to the video service. The video service monitor is further configured to monitor video content packets downloaded to the UE from a video server during the video service, and to detect that the video service has reached a particular stage. The transmitter is further configured to transmit a further notification to the PCRF indicating that the particular stage has been reached. The receiver is further configured to receive, from the PCRF, second QoS setting data identifying a second QoS setting that specifies a lower QoS than the first QoS setting. The quality assigner is configured to assign a QoS setting that corresponds to the received second QoS setting data to the video service.

Optionally, the particular stage of the video service is the end of a buffering phase and/or the beginning of a playout phase.

Optionally, the video service monitor is configured to determine that the end of a buffering phase and/or the beginning of a playout phase has been reached based on a rate at which the video content packets are downloaded.

Optionally, the video monitor is configured to determine playout period data indicating whether the video service is in an on period or an off period of the playout phase based on the rate at which the video content packets are downloaded.

Optionally, the transmitter is configured to transmit the playout period data to the PCRF, wherein the receiver is configured to receive third QoS setting data identifying a third QoS setting that specifies a lower QoS than the second QoS setting if the playout period data indicates an off period, and wherein the quality assigner is configured to assign a QoS setting that corresponds to the received third QoS setting data to the video service.

Optionally, a lower QoS is specified in a QoS setting with a higher QoS Class Identifier, QCI, value; and wherein a higher QoS is specified in a QoS setting with a lower QCI value.

Optionally, each QoS setting is associated with particular Radio Access Bearer, RAB, data.

According to the invention in a further aspect, there is provided a method for operating a network node for use as a Policy Control Enforcement Function, PCEF, in a Policy Charging Control architecture of a telecommunications system. The method comprises determining, by a video service monitor, whether a video service has started for streaming video content to a User Equipment, UE, of a user. The method comprises transmitting, by a transmitter to a Policy and Charging Rules Function, PCRF, a notification indicating that the video service has started. The method comprises receiving, by a receiver from the PCRF, first Quality of Service, QoS, setting data identifying a first QoS setting for streaming the video service to the UE. The method comprises assigning, by a quality assigner, the first QoS setting to the video service. The method comprises monitoring, by the video service monitor, video content packets downloaded to the UE from a video server during the video service. The method comprises detecting, by the video service monitor, that the video service has reached a particular stage. The method comprises transmitting, by the transmitter to the PCRF, a further notification indicating that the particular stage has been reached. The method comprises receiving, by the receiver from the PCRF, second QoS setting data identifying a second QoS setting that specifies a lower QoS than the first QoS setting. The method comprises assigning, by the quality assigner, a QoS setting that corresponds to the received second QoS setting data to the video service.

Optionally, the particular stage of the video service is the end of a buffering phase and/or the beginning of a playout phase.

Optionally, the method further comprises determining, by the video service monitor, that the end of a buffering phase and/or the beginning of a playout phase has been reached based on a rate at which the video content packets are downloaded.

Optionally, the method further comprises determining, by the video service monitor, playout period data indicating whether the video service is in an on period or an off period of the playout phase based on the rate at which the video content packets are downloaded.

Optionally, the method further comprises transmitting the playout period data, by the transmitter to the PCRF; receiving, by the receiver, third QoS setting data identifying a third QoS setting that specifies a lower QoS than the second QoS setting if the playout period data indicates an off period; and assigning, by the quality assigner to the video service, a QoS setting that corresponds to the received third QoS setting data.

Optionally, a lower QoS is specified in a QoS setting with a higher QoS Class Identifier, QCI, value; and wherein a higher QoS is specified in a QoS setting with a lower QCI value.

Optionally, each QoS setting is associated with particular Radio Access Bearer, RAB, data.

According to the invention in a further aspect, there is provided a computer program comprising instructions which, when executed on at least one processor, cause the at least one processor to carry out any method described herein.

According to the invention in a further aspect, there is provided a carrier containing the computer program above, wherein the carrier is one of an electronic signal, optical signal, radio signal, or non-transitory computer readable storage medium.

BRIEF DESCRIPTION OF THE DRAWINGS

Exemplary embodiments are disclosed herein with reference to the accompanying drawings, in which.

DETAILED DESCRIPTION

Generally, disclosed herein are methods and apparatus for reducing the Quality of Service (QoS), e.g. a QoS setting associated with a Radio Access Bearer (RAB), for streaming a video service after a particular stage of the video service, for example after the buffering phase 202. In exemplary methods and apparatus, a PCEF 102 may be configured to monitor a video service being streamed to a UE over a first RAB and determine when a particular stage of the video service is reached. The PCEF 102 may then transmit a notification to a PCRF 100, which may then determine a lower QoS setting for a second RAB than for the first RAB. The PCEF 102 may then trigger the second RAB for a period of the video service.

It is noted that the QoS settings need not be applied to an RAB, per se, but can be applied to any medium for carrying the video service. However, for clarity, the remainder of this description refers to QoS settings associated with an RAB.

Figure 1:
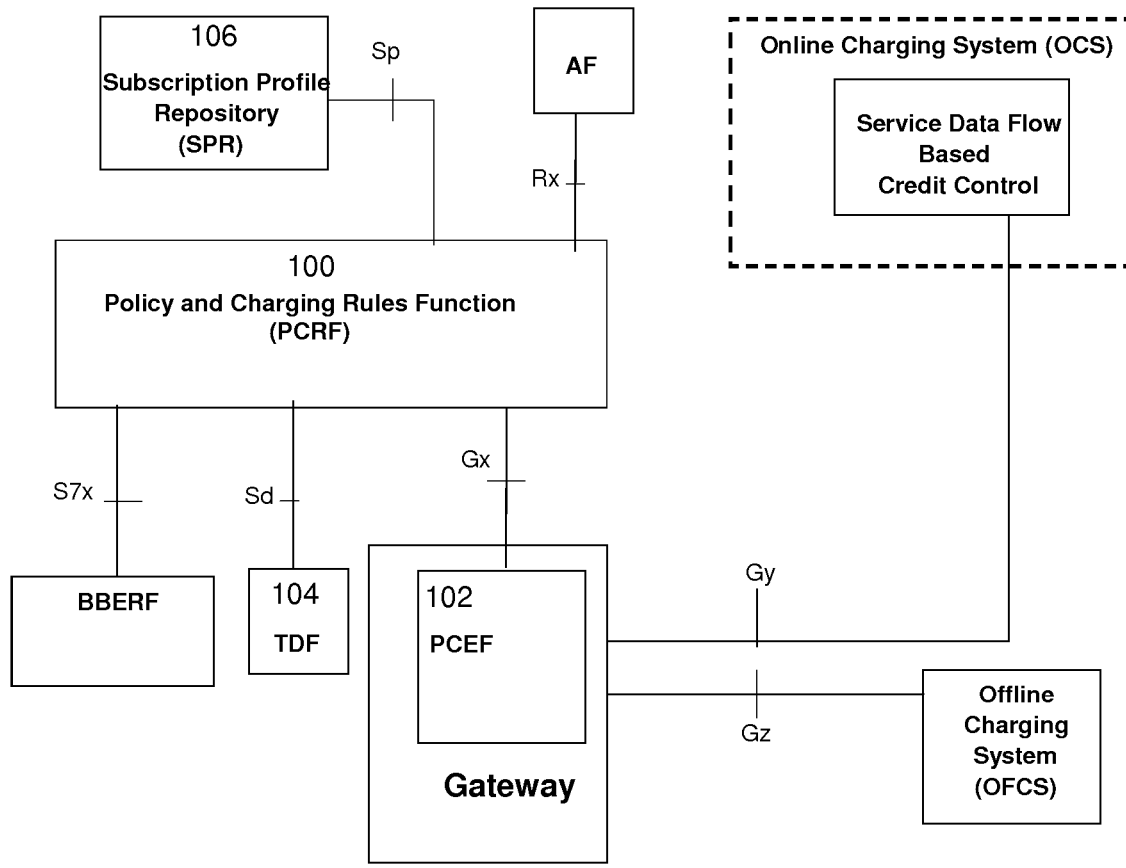
FIG. 1 is a schematic diagram of a PCC architecture.
Figure 2:
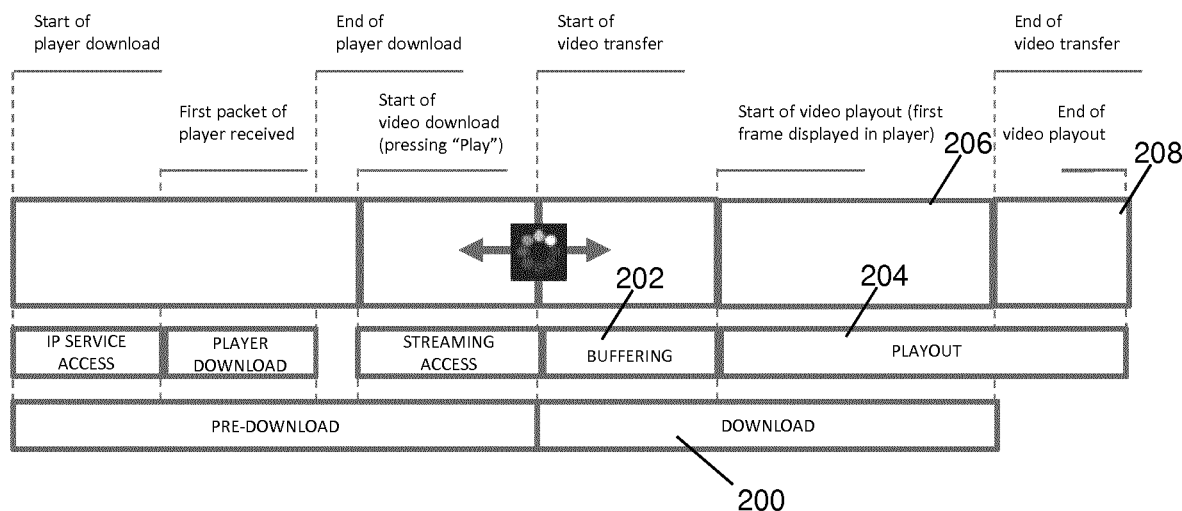
FIG. 2 is a schematic diagram showing the phases of a video service.
Figure 3:
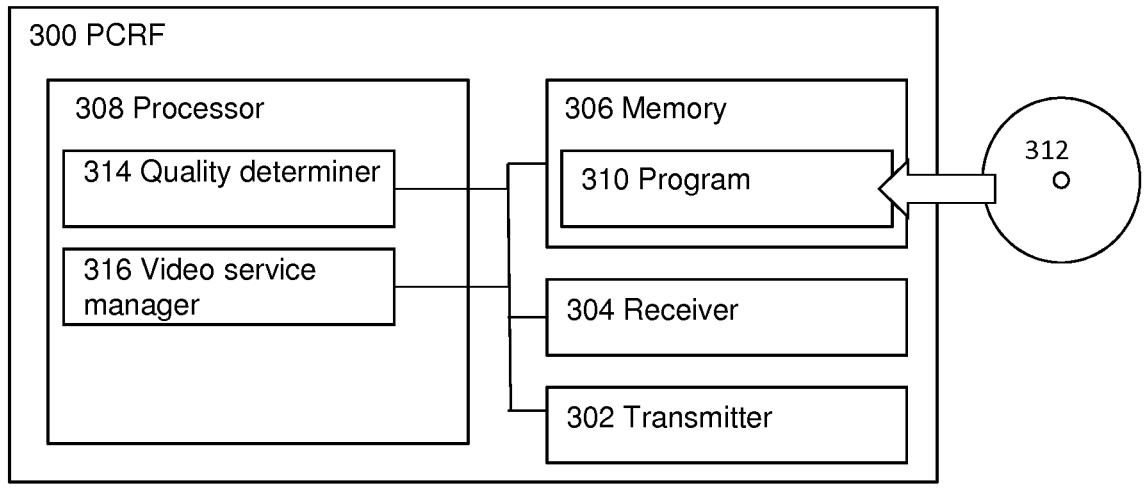
FIG. 3 is schematic diagram showing a PCRF.

FIG. 3 shows a schematic representation of a network node for implementing a PCRF 300. The PCRF 300 may be a PCRF 100 of FIG. 1. The PCRF 300 comprises a transmitter 302 and a receiver 304. The transmitter 302 and receiver 304 may be in data communication with other network entities in a telecommunications network and are configured to transmit and receive data accordingly.

The PCRF 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake one or more of the functions of a quality determiner 314 and a video service manager 316, as set out below.

Each of the transmitter 302 and receiver 304, memory 306, processor 308, quality determiner 314 and video service manager 316 is in data communication with the other features 302, 304, 306, 308, 310, 314, 316 of the PCRF 300. The PCRF 300 can be implemented as a combination of computer hardware and software. In particular, the quality determiner 314 and video service manager 316 may be implemented as software configured to run on the processor 308, or as combinations of hardware and software in separate modules. The memory 306 stores the various programs/executable files that are implemented by a processor 308, and also provides a storage unit for any required data. The programs/executable files stored in the memory 306, and implemented by the processor 308, can include the quality determiner 314 and the video service manager 316, but are not limited to such.

Figure 4:
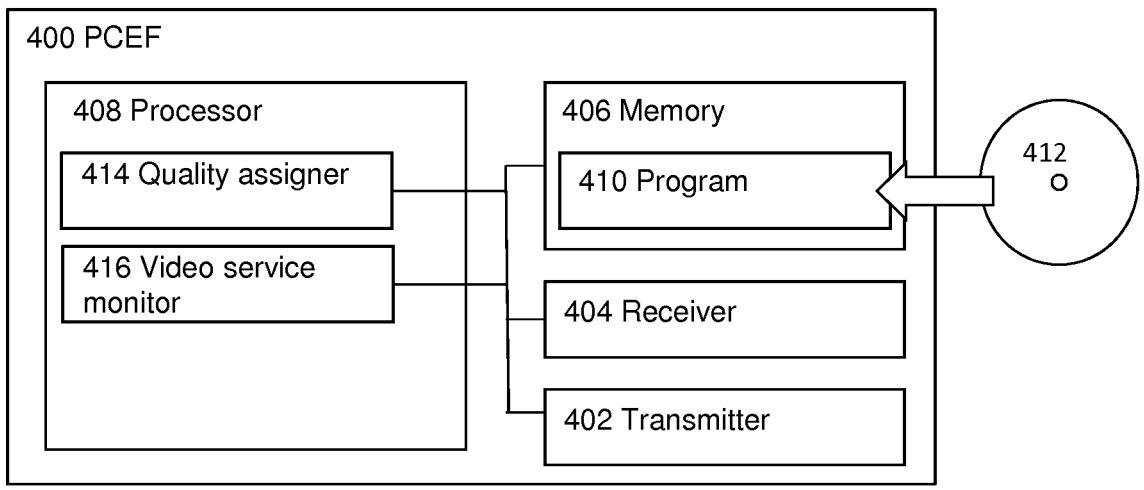
FIG. 4 is a schematic diagram showing a PCEF.

FIG. 4 shows a schematic representation of a network node for implementing a PCEF 400. The PCEF may be a PCEF 102 of FIG. 1. The PCEF 400 comprises a transmitter 402 and a receiver 404. The transmitter 402 and receiver 404 may be in data communication with other network entities in a telecommunications network and are configured to transmit and receive data accordingly.

The PCEF 400 further comprises a memory 406 and a processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake one or more of the functions of a quality assigner 414 and a video service monitor 416, as set out below.

Each of the transmitter 402 and receiver 404, memory 406, processor 408, quality assigner 414 and video service monitor 416 is in data communication with the other features 402, 404, 406, 408, 410, 414, 416 of the PCEF 400. The PCEF 400 can be implemented as a combination of computer hardware and software. In particular, the quality assigner 414 and video service monitor 416 may be implemented as software configured to run on the processor 408, or as combinations of hardware and software in separate modules. The memory 406 stores the various programs/executable files that are implemented by a processor 408, and also provides a storage unit for any required data. The programs/executable files stored in the memory 406, and implemented by the processor 408, can include the quality assigner 414 and video service monitor 416, but are not limited to such.

Table 1 below shows a plurality of QoS Class Indicators (QCIs) in a first column and information about each QCI in the remaining columns. It can be seen that the QCIs range from 1 to 15, with 1 being the highest QoS. Typically, the lower the QCI the higher the packet delay and the higher the packet error rate. It will be understood that the QCIs shown in Table 1 are merely exemplary and any measure of quality of service may be used. In exemplary methods and apparatus, a reduction in quality of a QoS setting associated, for example, with an RAB results in a higher packet delay and/or a higher packet error rate.

In known systems, once a video service is begun, the downloading of video content is prioritised by triggering an RAB with a relatively high priority (or QoS setting), that is, an RAB having a relatively low packet delay and a relatively low packet loss rate. In known systems, a QCI=6 may be used. This RAB is active during the whole video session with a corresponding usage of network resource. Methods and apparatus disclosed herein propose a mechanism to detect and notify when a particular stage in the video service is reached, after which a lower QoS setting is appropriate. For example, the QoS setting may be reduced after the end of the buffering phase 202 and the start of the playout phase 204. After the particular stage, e.g. during the playout phase, a second RAB with a lower QoS setting than the first RAB provided in the initial phase (e.g. during the buffering phase) is used. It is noted that the first and second RABs may actually be the same RAB and have the same RAB ID. In exemplary arrangements, only the QoS setting of the RAB is reduced.

TABLE 1

| QCI | Resource Type | Priority Level | Packet Delay Budget (NOTE 13) | Packet Error Loss Rate (NOTE 2) | Example Services |
|---|---|---|---|---|---|
| 1 (NOTE 3) | GBR | 2 | 100 ms (NOTE 1, NOTE 11) | $10^{-2}$ | Conversational Voice |
| 2 (NOTE 3) | | 4 | 150 ms (NOTE 1, NOTE 11) | $10^{-3}$ | Conversational Video (Live Streaming) |
| 3 (NOTE 3) | | 3 | 50 ms (NOTE 1, NOTE 11) | $10^{-3}$ | Real Time Gaming |
| 4 (NOTE 3) | | 5 | 300 ms (NOTE 1, NOTE 11) | $10^{-6}$ | Non-Conversational Video (Buffered Streaming) |
| 65 (NOTE 3, NOTE 9, NOTE 12) | | 0.7 | 75 ms (NOTE 7, NOTE 8) | $10^{-2}$ | Mission Critical user plane Push To Talk voice (e.g., MCPTT) |
| 66 (NOTE 3, NOTE 12) | | 2 | 100 ms (NOTE 1, NOTE 10) | $10^{-2}$ | Non-Mission-Critical user plane Push To Talk voice |
| 5 (NOTE 3) | Non-GBR | 1 | 100 ms (NOTE 1, NOTE 10) | $10^{-6}$ | IMS Signalling |
| 6 (NOTE 4) | | 6 | 300 ms (NOTE 1, NOTE 10) | $10^{-6}$ | Video (Buffered Streaming) TCP-based (e.g., www, e-mail, chat, ftp, p2p file sharing, progressive video, etc.) |
| 7 (NOTE 3) | | 7 | 100 ms (NOTE 1, NOTE 10) | $10^{-3}$ | Voice, Video (Live Streaming) Interactive Gaming |
| 8 (NOTE 5) | | 8 | 300 ms (NOTE 1) | $10^{-6}$ | Video (Buffered Streaming) TCP-based (e.g., www, e-mail, chat, ftp, p2p file sharing, progressive video, etc.) |

TABLE 1-continued

| QCI | Resource Type | Priority Level | Packet Delay Budget (NOTE 13) | Packet Error Loss Rate (NOTE 2) | Example Services |
|---|---|---|---|---|---|
| 9 (NOTE 6) | | 9 | | | |
| 69 (NOTE 3, NOTE 9, NOTE 12) | | 0.5 | 60 ms (NOTE 7, NOTE 8) | $10^{-6}$ | Mission Critical delay sensitive signalling (e.g., MC-PTT signalling) |
| 70 (NOTE 4, NOTE 12) | | 5.5 | 200 ms (NOTE 7, NOTE 10) | $10^{-6}$ | Mission Critical Data (e.g. example services are the same as QCI 6/8/9) |

NOTE 1:
A delay of 20 ms for the delay between a PCEF and a radio base station should be subtracted from a given PDB to derive the packet delay budget that applies to the radio interface. This delay is the average between the case where the PCEF is located "close" to the radio base station (roughly 10 ms) and the case where the PCEF is located "far" from the radio base station, e.g. in case of roaming with home routed traffic (the one-way packet delay between Europe and the US west coast is roughly 50 ms). The average takes into account that roaming is a less typical scenario. It is expected that subtracting this average delay of 20 ms from a given PDB will lead to desired end-to-end performance in most typical cases. Also, note that the PDB defines an upper bound. Actual packet delays - in particular for GBR traffic - should typically be lower than the PDB specified for a QCI as long as the UE has sufficient radio channel quality.
NOTE 2:
The rate of non congestion related packet losses that may occur between a radio base station and a PCEF should be regarded to be negligible. A PELR value specified for a standardized QCI therefore applies completely to the radio interface between a UE and radio base station.
NOTE 3:
This QCI is typically associated with an operator controlled service, i.e., a service where the SDF aggregate's uplink/downlink packet filters are known at the point in time when the SDF aggregate is authorized. In case of E-UTRAN this is the point in time when a corresponding dedicated EPS bearer is established/modified.
NOTE 4:
If the network supports Multimedia Priority Services (MPS) then this QCI could be used for the prioritization of non real-time data (i.e. most typically TCP-based services/applications) of MPS subscribers.
NOTE 5:
This QCI could be used for a dedicated "premium bearer" (e.g. associated with premium content) for any subscriber/ subscriber group. Also in this case, the SDF aggregate's uplink/downlink packet filters are known at the point in time when the SDF aggregate is authorized. Alternatively, this QCI could be used for the default bearer of a UE/PDN for "premium subscribers".
NOTE 6:
This QCI is typically used for the default bearer of a UE/PDN for non privileged subscribers. Note that AMBR can be used as a "tool" to provide subscriber differentiation between subscriber groups connected to the same PDN with the same QCI on the default bearer.
NOTE 7:
For Mission Critical services, it may be assumed that the PCEF is located "close" to the radio base station (roughly 10 ms) and is not normally used in a long distance, home routed roaming situation. Hence delay of 10 ms for the delay between a PCEF and a radio base station should be subtracted from this PDB to derive the packet delay budget that applies to the radio interface.
NOTE 8:
In both RRC Idle and RRC Connected mode, the PDB requirement for these QCIs can be relaxed (but not to a value greater than 320 ms) for the first packet(s) in a downlink data or signalling burst in order to permit reasonable battery saving (DRX) techniques.
NOTE 9:
It is expected that QCI-65 and QCI-69 are used together to provide Mission Critical Push to Talk service (e.g., QCI-5 is not used for signalling for the bearer that utilizes QCI-65 as user plane bearer). It is expected that the amount of traffic per UE will be similar or less compared to the IMS signalling.
NOTE 10:
In both RRC Idle and RRC Connected mode, the PDB requirement for these QCIs can be relaxed for the first packet(s) in a downlink data or signalling burst in order to permit battery saving (DRX) techniques.
NOTE 11:
In RRC Idle mode, the PDB requirement for these QCIs can be relaxed for the first packet(s) in a downlink data or signalling burst in order to permit battery saving (DRX) techniques.
NOTE 12:
This QCI value can only be assigned upon request from the network side. The UE and any application running on the UE is not allowed to request this QCI value.
NOTE 13:
Packet delay budget is not applicable on NB-IoT or when Enhanced Coverage is used for WB-E-UTRAN (see TS 36.300 [19]).

Figure 5:
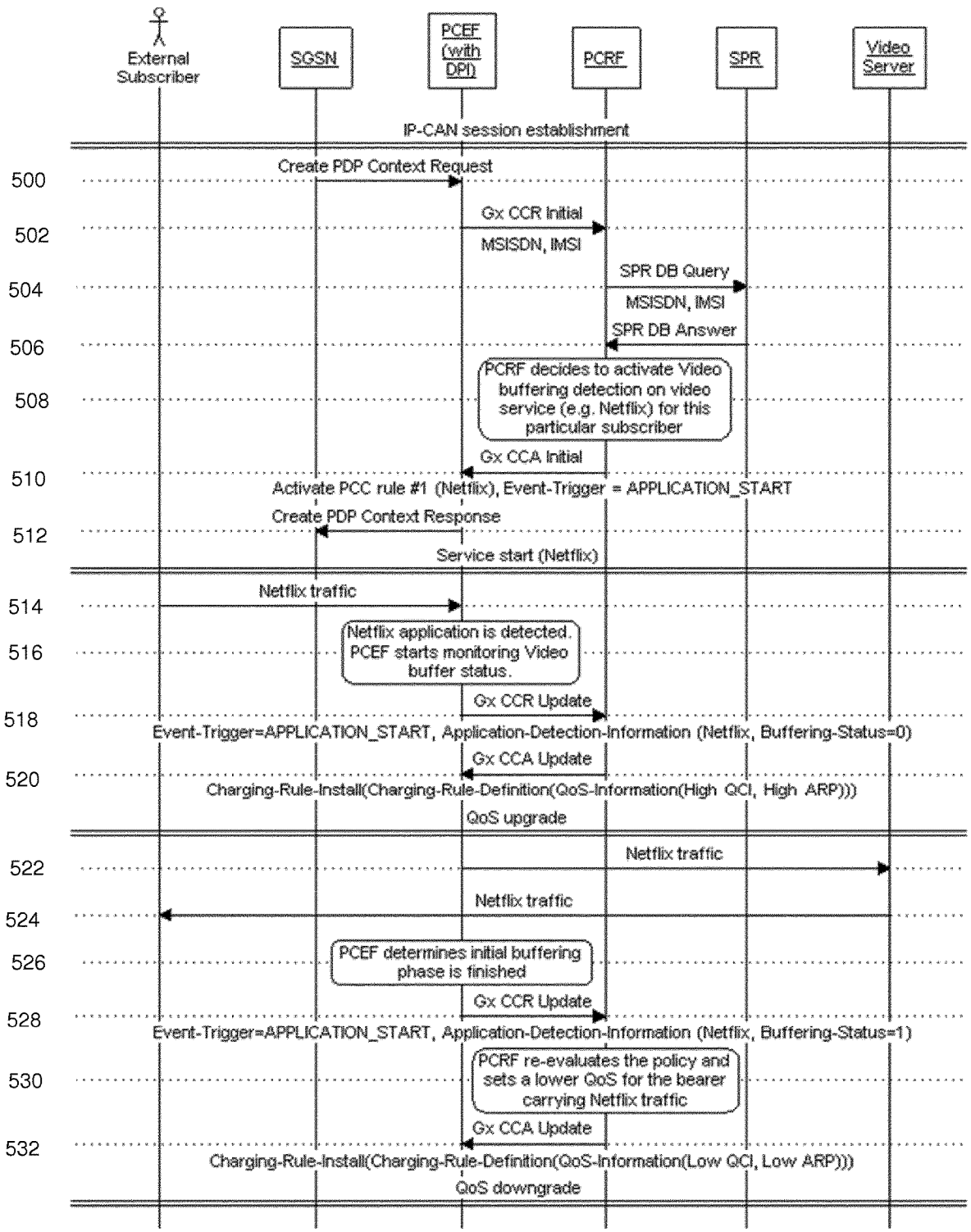
FIG. 5 is a signalling diagram showing a method for controlling streaming of a video service.

FIG. 5 shows a signaling diagram of an exemplary method for streaming a video service, the steps of which are explained in detail below.

500 An external subscriber (or user) establishes an IP-CAN session and a Serving General Packet Radio Service Support Node (SGSN) creates a Packet Data Protocol (PDP) context request (in the case of a Third Generation (3G) network) and transmits the request to the PCEF 102, 400, which may be a Gateway General Packet Radio Service Support Node (GGSN).

502 The PCEF 102, 400 transmits to the PCRF 100, 300 subscription information, such as a subscriber identity, for the user (e.g. an IMSI and/or a MSISDN) in a Gx initial CCR message.

504 Based on the received subscriber identity (e.g. an IMSI and/or a MSISDN), the PCRF 100, 300 transmits a SPR database query, which includes the subscriber identity, to the SPR 106.

506 Based on the subscriber identity in the SPR database query, the SPR 106 determines a subscriber profile for the subscriber including a video service monitoring parameter indicating that for this user video services need to be monitored to determine when a particular stage of the video service is reached, e.g. the end of the buffering phase or any other point after which QoS can be reduced, as this user has an active subscription to a video content provider package with high quality.

Accordingly, the SPR 106 is configured to store subscriber profiles comprising a parameter indicating that the video service is to be monitored. The parameter may be a flag in the subscriber profile that is readable by the PCRF 100, 300.

508 The receiver 304 of the PCRF 100, 300 receives the subscriber profile and the video service manager 316 determines, based on a status of the parameter in the subscriber profile, whether video services need to be monitored. The video service manager 316 of the PCRF 100, 300 will therefore activate corresponding PCC rules for this subscriber, based at least in part on the status of the parameter.

In exemplary arrangements, the PCRF 100, 300 will activate a PCC rule for an application associated with a particular video content provider (e.g. TDF-Application-Identifier=Netflix). This PCC rule will include a further video service monitoring parameter to indicate that video services need to be monitored by the PCEF 102, 400 to detect a particular stage of the video service, e.g. the end of the buffering phase, for videos provided by that video content provider. The PCRF 100, 300 may subscribe to the event trigger for APPLICATION_START for the application associated with the video content provider. This is an existing event trigger, which means there is no requirement to alter the Gx interface between the PCRF 100, 300 and the PCEF 102, 300 to accommodate a new event trigger.

510 The transmitter 302 transmits the activated PCC rules and the event trigger subscription to the PCEF 102, 400.

512 IP-CAN session establishment is completed by the transmitter 402 of the PCEF 102, 400 transmitting a PDP context response (in case of 3G networks) to the SGSN.

514 After the UE starts the application associated with the video content provider, traffic associated with the application is transmitted to the PCEF 102, 400.

516 The video service monitor 416 of the PCEF 102, 400 detects the traffic associated with that application (e.g. through the DPI technology, such as the TDF 104).

518 The video service monitor 416 controls the transmitter 404 to transmit towards the PCRF 100, 300 a notification (e.g. through Event-Trigger for APPLICATION-START) indicating that a video service is beginning.

520 The quality determiner 314 of the PCRF 100, 300 determines based on the user subscription profile received from the SPR 106 a first QoS setting for streaming the video content associated with the video service. The first QoS setting has an appropriate quality for the identified user and the video service. Typically, a high quality bearer with better QoS will be assigned in order to ensure the initial buffering phase is fast enough allowing the video to be displayed as soon as possible. For example, referring to Table 1 above, a QoS setting associated with an RAB having a QCI=6 may be determined by the quality determiner 314. Data identifying the determined first QoS setting is transmitted by the transmitter 302 to the PCEF.

522-4 The quality assigner 414 of the PCEF 102, 400 assigns the first QoS setting to the video service for downloading video content packets from a video server. Therefore, those video content packets are downloaded to the UE from the video server using the first QoS setting, which may be associated with a first RAB.

526 The video service monitor 416 monitors (e.g. using DPI technology) the traffic associated with the content provider application and detects that a particular stage of the video service has been reached. In exemplary arrangements, the particular stage of the video service may be the end of the buffering phase 202 and/or the beginning of the playout phase 204. This may provide an advantage because a high QoS setting is useful during the initial buffering phase 202 so that sufficient video content is stored at the UE to allow the video to be played as quickly as possible. After that initial buffering phase 202, the QoS setting may be reduced without impacting video playback.

The initial buffering phase 202 starts when the end user receives the first packet in the stream including video content and ends when a buffer at the UE is full and the first frame of the video displayed to the user. After that, the playout phase 204 begins. In the playout phase 204 the UE typically does not download video content packets constantly. This means that video content packets are downloaded intermittently, optionally at regular or at irregular intervals. In exemplary arrangements, the video service monitor 416 may be configured to detect the particular stage of the video service based on the time between downloading of video content packets. For example, the video service monitor 416 may determine that the buffering phase 202 has finished by detecting an increase in the time between downloading of video content packets. This may be termed the inter-arrival time of packets, $T_{ia}$, and one possible algorithm employed by the video service monitor 416 is:

IF $(T_{packet\ n} - T_{packet\ n-1}) >= $ Time
  Then
    Playout Phase
  Else
    Initial Buffering Phase Where 'T' is the receiving time of a packet, and where 'Time' is a number based on experimental results and might be e.g. around 2 seconds.

528 The transmitter 402 of the PCEF 102, 400 transmits a notification towards the PCRF 100, 300 to indicate that the particular stage of the video service, e.g. the end of the buffering phase 202, has been reached. In exemplary methods and apparatus, it is proposed to use the Gx protocol to transmit the notification. In exemplary arrangements, the existing Event-Trigger for APPLICATION-START may be extended by means of including in the Application-Detection-Information AVP a new sub-AVP indicating whether the buffering phase 202 is active or has ended. The sub-AVP may have the following format:

Attribute Name: Buffering-Status
Attribute Value (Boolean):
  0 when buffering status is alive (this is the value used at Step 518)
  1 when buffering status ends (this is the value used at Step 528)
Application-Detection-Information::=<AVP Header: 1098>
  {TDF-Application-Identifier}
  [TDF-Application-Instance-Identifier]
  *[Flow-Information]
  *[Buffering-Status]
  *[AVP]

If the PCRF 100, 300 has subscribed to APPLICATION_START/APPLICATION_STOP Event-Triggers, the Application-Detection-Information AVP may be used to report the start/stop of the video content traffic associated with the video content provider application, defined by TDF-Application-Identifier.

530 The receiver 304 of the PCRF 102, 300 receives the notification from the PCEF 102, 400 and the quality determiner 314 determines a second QoS setting having a lower QoS than the first QoS setting for streaming the video content packets of the video service. The quality determiner 314 activates/installs a PCC rule for the second QoS setting that has lower QoS than the first QoS setting. Therefore, the PCC rule for the second QoS setting may identify, for example, a higher packet delay, a higher packet loss rate and/or a lower Allocation Retention Policy (ARP) than the PCC rule for the first QoS setting. For example, after receipt of the notification, the quality determiner 314 may determine a second QoS setting having a QCI in a range from 8 to 10 and in specific exemplary arrangements a QCI of 9.

532 The transmitter 302 transmits data identifying the second QoS setting to the PCEF 102, 400. The quality assigner 414 of the PCEF 102, 400 assigns the second QoS setting to the video service for streaming video content packets of the video service.

As discussed above, exemplary methods and apparatus may be configured to implement a first RAB having a QCI of 6 during the buffering phase 202, and a second RAB having a QCI of 9 during the playout phase.

Figure 6:
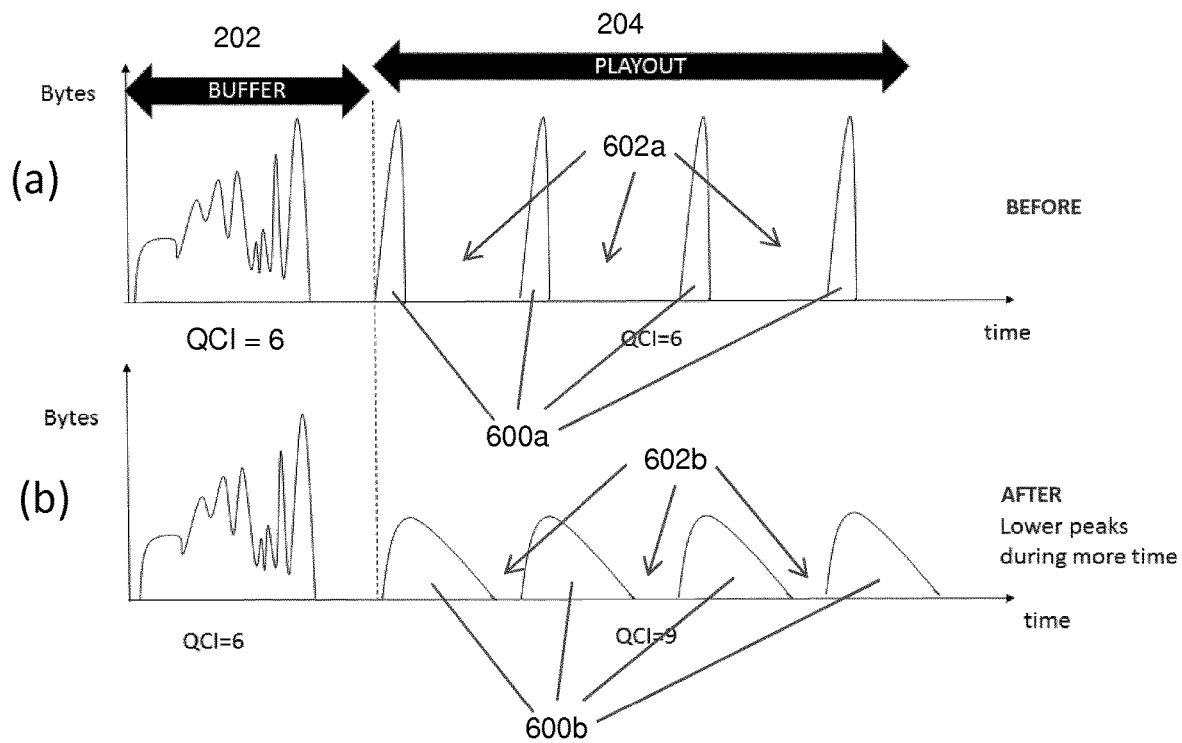
FIGS. 6a and 6b are plots showing a number of bytes of video content downloaded during buffering and playout phases.

The effects of the methods and apparatus disclosed herein are shown in FIGS. 6*a* and 6*b*, which comprise plots of bytes of video content downloaded against time in known systems (FIG. 6*a*) and after implementation of one or more methods and apparatus disclosed herein (FIG. 6*b*). FIG. 6 focusses on the example of the particular stage of the video service being the end of the buffering phase 202, however it will be understood that the methods and apparatus disclosed herein may be implemented at any other stage of the video service where a change in QoS setting may be implemented without impacting the quality of the user experience.

In FIG. 6*a* the QCI of the RAB for streaming video content packets is 6 throughout the download phase 200 of the video service. After initial buffering 202, the video service enters a playout phase 204 during which video content packets are downloaded intermittently. This is shown by the peaks of bytes 600*a*, which define "on" periods. The peaks 600*a* have periods 602*a* therebetween when no video content is downloaded, which may be termed silent or "off" periods. During the off periods 602*a*, the RAB has a relatively high QoS and therefore uses a large amount of network resources, even though no video content is being downloaded. Further, the on periods 600*a* are of short duration because the video content packets are downloaded more quickly due to the high QoS of the RAB. This means that the off periods 602*a* have a greater duration and the network resources allocated to the RAB are unused for longer.

FIG. 6*b* shows the same video download when methods and apparatus disclosed herein are applied. As with FIG. 6*a*, the buffering phase 202 is assigned QCI=6, while the playout phase 204 is assigned QCI=9, which has a lower QoS setting compared to QCI=6. Compared with the on periods 600*a*, the on periods 600*b* have lower peaks with a greater duration due to the lower QoS of the RAB in the playout phase 204. This does not impact the downloading of the video content negatively because all of the necessary video content packets are still downloaded before the subsequent peak, but there is less of a demand on network resources.

Figure 7:
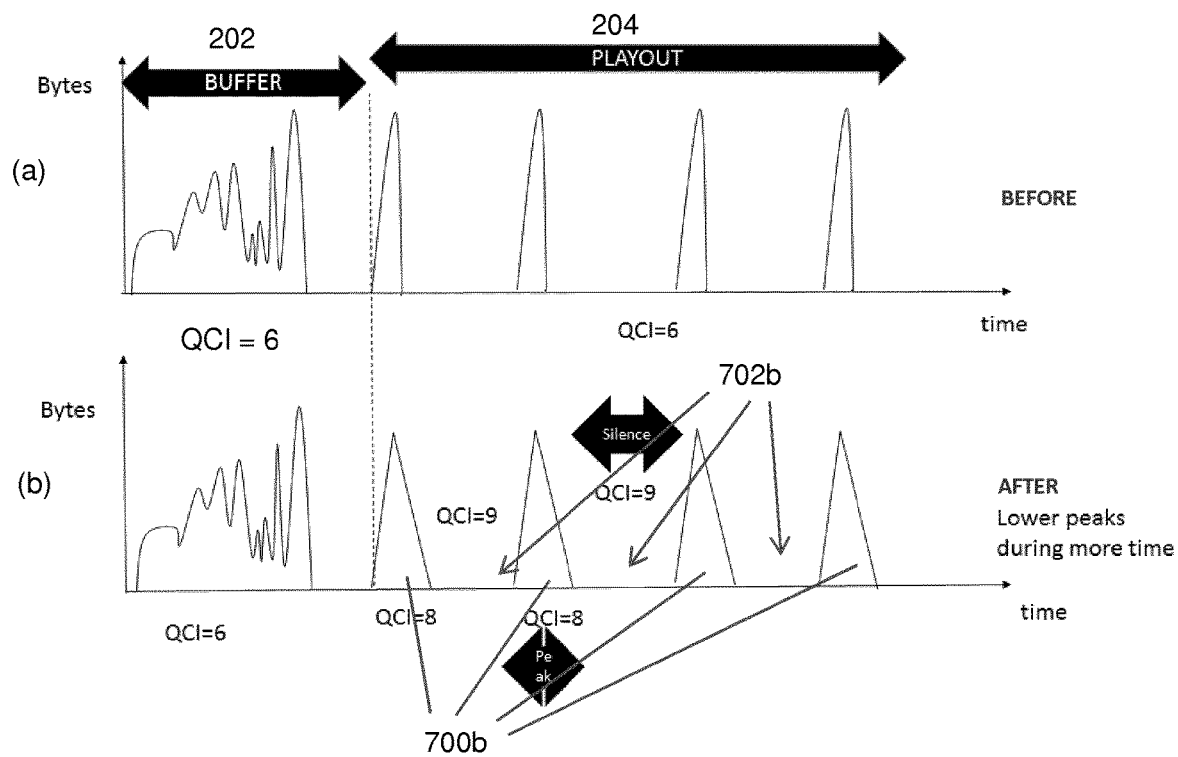
FIGS. 7a and 7b are plots showing a number of bytes of video content downloaded during buffering and playout phases.

In further exemplary methods and apparatus, the second RAB (used, for example, during the playout phase 204) may have a lower QoS setting during the off periods than during the on periods. In exemplary methods and apparatus, both the on period QoS setting and the off period QoS setting are lower than the first QoS setting. An example of this is shown in FIG. 7.

In the same way as shown in FIG. 6*b*, after the particular stage of the video service (e.g. when the playout phase 204 has begun), the quality determiner 314 determines a second QoS setting, e.g. QCI=8, having a lower QoS than the first QoS setting, e.g. QCI=6, used before the particular stage of the video service. The playout phase is characterised by intermittent bursts of downloaded video content packets, as shown in FIG. 7*a*. Therefore, methods and apparatus may be configured to use the second QoS setting during on periods (i.e. when video content packets are being downloaded) 700*b*, and a third QoS setting, e.g. QCI=9, during off periods 702*b*. The third QoS setting may have a lower QoS because video content packets are not downloaded during those periods.

Accordingly, the video service monitor 416 of the PCEF 102, 400 may be configured to determine when no video content packets are being downloaded from the video server to the UE. For example, if the video service monitor 416 detects no video content packets during a specified time period then it may determine that the off period 702*b* has begun. The transmitter 402 of the PCEF 102, 400 transmits playout period data indicating whether the playout phase 204 is in an on or an off period. If an off period is detected then the playout period data comprises a notification to the PCRF 100, 300 that the off period has begun. The quality determiner 314 determines a third QoS setting having a QoS lower than the second QoS setting and the transmitter 302 transmits data identifying the third RAB to the PCEF 102, 400. The quality assigner 414 assigns the third QoS setting to the video service.

The video service monitor 416 continues to monitor video content packets and when it detects that the rate of download of those packets increases above a threshold, the video service monitor 416 determines that the on period 700*b* has begun. In a similar way to that discussed above, transmitter 402 of the PCEF transmits playout period data to the PCRF 100, 300 indicating that the on period has begun. In response, data identifying the second QoS setting is transmitted from the PCRF 100, 300 to the PCEF 102, 400. The second QoS setting, which has a QoS lower than the first QoS setting and higher than the third QoS setting, is assigned to the video service by the quality assigner 414 during the on period 700*b*. This process is repeated during the playout phase 204. In exemplary arrangements, the QoS of the second QoS setting may be such that it has a QCI=8 and the QoS of the third QoS setting may be such that it has a QCI=9.

In an embodiment of the invention, once the PCRF 100, 300 has transmitted to the PCEF 102, 400 the first QoS setting, the second QoS setting and the third QoS setting, the PCEF 102, 400 may assign the required QoS for the on and off periods on its own, without further consulting with the PCRF.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A network node for use as a Policy and Charging Rules Function, PCRF, in a Policy Charging Control architecture of a telecommunications system, the network node comprising:
a receiver configured to receive from a Policy Control Enforcement Function, PCEF, a notification indicating that a video service has started for streaming video content to a User Equipment, UE, of a user;
a quality determiner configured to determine a first Quality of Service, QoS, setting for streaming the video service to the UE;
a transmitter configured to transmit first QoS setting data identifying the first QoS setting to the PCEF;
the receiver being further configured to receive a further notification from the PCEF indicating that the video service has reached a particular stage,
wherein the particular stage of the video service is at least one of the end of a buffering phase and the beginning of a playout phase;
the quality determiner being further configured, in response to the further notification, to determine a second QoS setting specifying a lower QoS than the first QoS setting and for streaming the video service after the particular stage; and
the transmitter being configured to transmit second QoS setting data identifying the second QoS setting to the PCEF.

2. The network node according to claim 1, wherein the receiver is configured to receive playout period data from the PCEF indicating whether the video service is in an on period or an off period of the playout phase;
wherein the quality determiner is configured to determine the second QoS setting if the playout period data indicates an on period, and to determine a third QoS setting specifying a lower QoS than the second QoS setting if the playout period data indicates an off period; and
wherein the transmitter is configured, if the third QoS setting is determined, to transmit third QoS setting data identifying the third QoS setting to the PCEF.

3. The network node according to claim 1, wherein the receiver is further configured to receive subscription information for the user from a Subscription Profile Repository, SPR;
the network node further comprising a video service manager configured, based on the received subscription information, to determine whether the video service should be monitored to identify one or more particular stages; and
wherein the transmitter is configured to transmit to the PCEF video service monitoring data identifying whether the video service should be monitored.

4. A method for operating a network node for use as a Policy and Charging Rules Function, PCRF, in a Policy Charging Control architecture of a telecommunications system, the method comprising:
receiving, by a receiver from a Policy Control Enforcement Function, PCEF, a notification indicating that a video service has started for streaming video content to a User Equipment, UE, of a user;
determining, by a quality determiner, a first Quality of Service, QoS, setting for streaming the video service to the UE;
transmitting, by a transmitter, first QoS setting data identifying the first QoS setting to the PCEF;
receiving, by the receiver, a further notification from the PCEF indicating that the video service has reached a particular stage,
wherein the particular stage of the video service is at least one of the end of a buffering phase and the beginning of a playout phase;
determining, by the quality determiner and in response to the further notification, a second QoS setting specifying a lower QoS than the first QoS setting and for streaming the video service after the particular stage; and transmitting, by the transmitter, second QoS setting data identifying the second QoS setting to the PCEF.

5. The method according to claim 4, further comprising receiving, by the receiver from the PCEF, playout period data indicating whether the video service is in an on period or an off period of the playout phase;
one of:
  determining, by the quality determiner, the second QoS setting if the playout period data indicates an on period; and
  determining, by the quality determiner, a third QoS setting specifying a lower QoS than the second QoS setting if the playout period data indicates an off period; and
if the third QoS setting is determined, transmitting, by the transmitter to the PCEF, third QoS setting data identifying the third QoS setting.

6. The method according to claim 4, further comprising receiving, by the receiver from a Subscription Profile Repository, SPR, subscription information for the user;
  determining, by a video service manager and based on the received subscription information, whether the video service should be monitored to identify one or more particular stages; and
  transmitting, by the transmitter to the PCEF, video service monitoring data identifying whether the video service should be monitored.

7. A network node for use as a Policy Control Enforcement Function, PCEF, in a Policy Charging Control architecture of a telecommunications system, the network node comprising:
  a video service monitor configured to determine whether a video service has started for streaming video content to a User Equipment, UE, of a user;
  a transmitter configured to transmit to a Policy and Charging Rules Function, PCRF, a notification indicating that the video service has started;
  a receiver configured to receive from the PCRF first Quality of Service, QoS, setting data identifying a first QoS setting for streaming the video service to the UE;
  a quality assigner configured to assign the first QoS setting to the video service;
  the video service monitor being further configured to monitor video content packets downloaded to the UE from a video server during the video service, and to detect that the video service has reached a particular stage;
  the transmitter being further configured to transmit a further notification to the PCRF indicating that the particular stage has been reached,
  wherein the particular stage of the video service is at least one of the end of a buffering phase and the beginning of a playout phase;
  the receiver being further configured to receive, from the PCRF, second QoS setting data identifying a second QoS setting that specifies a lower QoS than the first QoS setting; and
  the quality assigner being configured to assign a QoS setting that corresponds to the received second QoS setting data to the video service.

8. The network node according to claim 7, wherein the video service monitor is configured to determine the one of that the end of a buffering phase and the beginning of a playout phase has been reached based on a rate at which the video content packets are downloaded.

9. The network node according to claim 7, wherein the video monitor is configured to determine playout period data indicating whether the video service is in an on period or an off period of the playout phase based on the rate at which the video content packets are downloaded.

10. The network node according to claim 9, wherein the transmitter is configured to transmit the playout period data to the PCRF, wherein the receiver is configured to receive third QoS setting data identifying a third QoS setting that specifies a lower QoS than the second QoS setting if the playout period data indicates an off period; and
  wherein the quality assigner is configured to assign a QoS setting that corresponds to the received third QoS setting data to the video service.

11. The network node according to claim 7, wherein each QoS setting is associated with particular Radio Access Bearer, RAB, data.

12. A method for operating a network node for use as a Policy Control Enforcement Function, PCEF, in a Policy Charging Control architecture of a telecommunications system, the method comprising:
  determining, by a video service monitor, whether a video service has started for streaming video content to a User Equipment, UE, of a user;
  transmitting, by a transmitter to a Policy and Charging Rules Function, PCRF, a notification indicating that the video service has started;
  receiving, by a receiver from the PCRF, first Quality of Service, QoS, setting data identifying a first QoS setting for streaming the video service to the UE;
  assigning, by a quality assigner, the first QoS setting to the video service;
  monitoring, by the video service monitor, video content packets downloaded to the UE from a video server during the video service;
  detecting, by the video service monitor, that the video service has reached a particular stage,
  transmitting, by the transmitter to the PCRF, a further notification indicating that the particular stage has been reached,
  wherein the particular stage of the video service is at least one of the end of a buffering phase and the beginning of a playout phase;
  receiving, by the receiver from the PCRF, second QoS setting data identifying a second QoS setting that specifies a lower QoS than the first QoS setting; and
  assigning, by the quality assigner, a QoS setting that corresponds to the received second QoS setting data to the video service.

13. The method according to claim 12, further comprising determining, by the video service monitor the one of that the end of a buffering phase and the beginning of a playout phase has been reached based on a rate at which the video content packets are downloaded.

14. The method according to claim 12, further comprising determining, by the video service monitor, playout period data indicating whether the video service is in an on period or an off period of the playout phase based on the rate at which the video content packets are downloaded.

15. The method according to claim 14, further comprising transmitting the playout period data, by the transmitter to the PCRF;
  receiving, by the receiver, third QoS setting data identifying a third QoS setting that specifies a lower QoS than the second QoS setting if the playout period data indicates an off period; and assigning, by the quality assigner to the video service, a QoS setting that corresponds to the received third QoS setting data.

16. The method according to claim 12, wherein each QoS setting is associated with particular Radio Access Bearer, RAB, data.

* * * * *